United States Patent
Lim (10) Patent No.: US 9,417,483 B2
(45) Date of Patent: Aug. 16, 2016

(54) COMPOSITION FOR ALIGNMENT LAYER AND LIQUID CRYSTAL DISPLAY PANEL

(71) Applicant: Samsung Display Co., LTD., Yongin, Gyeonggi-Do (KR)

(72) Inventor: Ho Lim, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 75 days.

(21) Appl. No.: 14/291,066

(22) Filed: May 30, 2014

(65) Prior Publication Data

US 2015/0185560 A1    Jul. 2, 2015

(30) Foreign Application Priority Data

Dec. 31, 2013  (KR) .................. 10-2013-0167939

(51) Int. Cl.
*C09K 19/00* (2006.01)
*G02F 1/1337* (2006.01)
*C09D 185/02* (2006.01)

(52) U.S. Cl.
CPC ........ *G02F 1/133711* (2013.01); *C09D 185/02* (2013.01); *G02F 2001/133726* (2013.01); *Y10T 428/1005* (2015.01); *Y10T 428/1009* (2015.01)

(58) Field of Classification Search
CPC .............. G02F 1/133711; G02F 2001/133726; Y10T 428/1005; Y10T 428/1009; C09K 19/56; C09D 185/02; C08G 79/025
USPC ........... 528/1.2, 1.21, 399; 349/123; 524/233, 524/306, 361; 558/199
See application file for complete search history.

(56) References Cited

FOREIGN PATENT DOCUMENTS

| KR | 100239794 B1 | 10/1999 |
|---|---|---|
| KR | 100239794 | * 1/2000 |
| KR | 1020120058657 A | 6/2012 |

* cited by examiner

*Primary Examiner* — Ruiyun Zhang
(74) *Attorney, Agent, or Firm* — Cantor Colburn LLP (57) ABSTRACT

A composition for an alignment layer includes about 1% by weight to about 30% by weight of a polyphosphazene-based compound and a remainder of a solvent. The polyphosphazene-based compound includes a polyphosphazene backbone, a reactive mesogen element linked to the polyphosphazene backbone, and a vertical alignment element linked to the polyphosphazene backbone.

10 Claims, 1 Drawing Sheet

COMPOSITION FOR ALIGNMENT LAYER AND LIQUID CRYSTAL DISPLAY PANEL

This application claims priority to Korean Patent Application No. 10-2013-0167939, filed on Dec. 31, 2013, and all the benefits accruing therefrom under 35 U.S.C. §119, the content of which in its entirety is herein incorporated by reference.

BACKGROUND

1. Field

Exemplary embodiments of the invention relate to a composition for an alignment layer and a liquid crystal display panel. More particularly, exemplary embodiments of the invention relate to a composition for an alignment layer including a phosphazene compound and a liquid crystal display panel improving a display quality.

2. Description of the Related Art

A liquid crystal display apparatus is one of a flat panel display ("FPD"). Examples of the flat panel display include, but are not limited to, a liquid crystal display ("LCD"), a plasma display panel ("PDP") and an organic light emitting display ("OLED").

The liquid crystal display apparatus applies a voltage to molecules of liquid crystals in a liquid crystal cell to adjust the arrangement of the molecules thereby changing optical characteristics such as birefringence, optical activity, dichroism and light scattering, to display an image.

The liquid crystal display apparatus includes a liquid crystal display panel and a backlight assembly. Liquid crystal molecules of the liquid crystal display panel may be aligned in a uniform direction to have uniform brightness and a high contrast ratio.

A reactive mesogen may be included in a liquid crystal layer for aligning liquid crystal molecules. Reactive mesogens may also be included in an alignment layer in order to improve transmissivity and response time of the liquid crystal display. An alignment liquid for forming the alignment layer in a liquid crystal display apparatus may include a polyimide molecule having functional groups such as, a vertical alignment element and a reactive mesogen. Properties of the vertical alignment element and properties of the reactive mesogen are different from each other. Thus, when the alignment liquid is dried, a phase separation may occur, so that the liquid crystal display panel may have smear thereon.

The polyimide molecule is formed from reaction of diamine and anhydride, and the functional groups can be introduced with only diamine. However, the functional groups are too bulky, and as a result, the polymerization time is too long, it is difficult to obtain a polymer having a high molecular weight, and smearing can occur due to the presence of un-reacted monomers. Furthermore, the functional groups are combined with the diamine, and then the diamine reacts with the anhydride. Thus, it is difficult to increase the content of the reactive mesogen in the polyimide. Thus, reactivity of the reactive mesogen may decrease, and as a result, mechanical strength may decrease. Therefore, the formation of an afterimage on the liquid crystal display panel may occur.

SUMMARY

Exemplary embodiments of the invention provide a composition for an alignment layer including a single component macromolecule and a solvent having a low boiling point.

Exemplary embodiments of the invention also provide a liquid crystal display panel manufactured by using the composition for the alignment layer.

According to an exemplary embodiment, a composition for an alignment layer includes about 1 percent (%) by weight to about 30% by weight of a polyphosphazene-based compound and a solvent. The polyphosphazene-based compound includes a polyphosphazene backbone, a reactive mesogen element linked to the polyphosphazene backbone, and a vertical alignment element linked to the polyphosphazene backbone.

In an exemplary embodiment, the polyphosphazene-based compound is represented by the following Chemical Formula 1,

Chemical Formula 1

In Chemical Formula 1, R1 and R2 are —X—Y-A-Y—Z and —X—Y—B—Y—Z, respectively; X is —NH— or —O—; Y is a single bond, an alkyl group having 1 to 20 carbons, —CO—, —COO— —$(CH_2)_l$O—, —$(CH_2)_l$NH—, —$(CH_2)_l$—COO— or —CO$(CH_2)_l$—COO—, and l is an integer of 1 to 10; A is B is

Z is hydrogen, an alkyl group having 1 to 20 carbons, or an epoxy group and "n is an integer of 1 to 10,000.

In an exemplary embodiment, the polyphosphazene-based compound is represented by the following Chemical Formula 2,

Chemical Formula 2

In Chemical Formula 2 R1, R2, R3 and R4 are independently —X—Y-A-Y—Z, —X—Y—B—Y—Z or —X—C; X is —NH— or —O—; Y is a single bond, an alkyl group having 1 to 20 carbons, —CO—, —COO— —($CH_2$)$_l$O—, —($CH_2$)$_l$NH—, —($CH_2$)$_l$—COO— or —CO($CH_2$)$_l$—COO—, and l is an integer of 1 to 10; A is B is C is an alkyl group having 1 to 10 carbons or halogen substituted saturated or unsaturated hydrocarbon having 1 to 10 carbons; Z is hydrogen, an alkyl group having 1 to 20 carbons, or an epoxy group, and m represents an integer of 1 to 5,000.

In an exemplary embodiment, the polyphosphazene-based compound is a reaction product of polydichlorophosphazene, the reactive mesogen element and the vertical alignment element.

In an exemplary embodiment, the polydichlorophosphazene is a polymer of hexachlorocyclotriphosphazene.

In an exemplary embodiment, a weight-average molecular weight of the polyphosphazene-based compound is about 1,000 to about 10,000,000.

In an exemplary embodiment, a boiling point of the solvent is equal to or less than 150 degrees Celsius (° C.).

In an exemplary embodiment, the solvent includes at least one of tetrahydrofuran, ethyl acetate, toluene, dichloromethane, acetone, methylethylketone, dimethylformamide, and cyclohexane.

In accordance with an exemplary embodiment, a liquid crystal display panel includes a first substrate, a second substrate and an alignment layer. The second substrate faces the first substrate. The alignment layer is disposed on at least one of a surface of the first substrate and a surface of the second substrate, and the alignment layer includes a polyphosphazene-based compound including a polyphosphazene backbone, a reactive mesogen element linked to the polyphosphazene backbone, and a vertical alignment element linked to the polyphosphazene backbone.

In an exemplary embodiment, the polyphosphazene-based compound is represented by the following Chemical Formula 1,

Chemical Formula 1

In Chemical Formula 1 R1 and R2 are —X—Y-A-Y—Z and —X—Y—B—Y—Z, respectively; X is —NH— or —O—; Y is a single bond, an alkyl group having 1 to 20 carbons, —CO—, —COO— —($CH_2$)$_l$O—, —($CH_2$)$_l$NH—, —($CH_2$)$_l$—COO— or —CO($CH_2$)$_l$—COO—, and l is an integer of 1 to 10; A is B is

Z is hydrogen, an alkyl group having 1 to 20 carbons, or an epoxy group; and n is an integer of 1 to 10,000.

In an exemplary embodiment, the polyphosphazene-based compound is represented by the following Chemical Formula 2, Chemical Formula 2

In Chemical Formula 2, R1, R2, R3 and R4 are independently —X—Y-A-Y—Z, —X—Y—B—Y—Z or —X—C; X is —NH— or —O—; Y is a single bond, an alkyl group having 1 to 20 carbons, —CO—, —COO— —(CH$_2$)$_l$O—, —(CH$_2$)$_l$NH—, —(CH$_2$)$_l$—COO— or —CO(CH$_2$)$_l$—COO—, and l is an integer of 1 to 10; A is B B is C is an alkyl group having 1 to 10 carbons or halogen substituted saturated or unsaturated hydrocarbon having 1 to 10 carbons; Z is hydrogen, an alkyl group having 1 to 20 carbons, or an epoxy group; and "m is an integer of 1 to 5,000.

In an exemplary embodiment, the polyphosphazene-based compound is a reaction product of polydichlorophosphazene, the reactive mesogen element and the vertical alignment element.

In an exemplary embodiment, a weight-average molecular weight of the polyphosphazene-based compound is about 1,000 to about 10,000,000.

In an exemplary embodiment, an alignment of the polyphosphazene backbone is parallel to the first substrate and the second substrate.

In an exemplary embodiment, the liquid crystal display panel further includes a liquid crystal layer between the first substrate and the second substrate.

In an exemplary embodiment, the liquid crystal layer includes liquid crystal molecules, and an alignment of the liquid crystal molecules is vertical to the first substrate and the second substrate.

In an exemplary embodiment, the alignment layer includes a first alignment layer between the first substrate and the liquid crystal layer, and a second alignment layer may be between the second substrate and the liquid crystal layer.

In an exemplary embodiment, a thickness of the alignment layer is about 10 micrometers (μm) to about 100 μm.

In an exemplary embodiment, terminal groups of the reactive mesogen element are cross-linked with each other.

In an exemplary embodiment, the cross-linked terminal groups of the reactive mesogen element may are arranged in a pretilt angle against the first substrate and the second substrate.

In such embodiments, the composition for the alignment layer includes a macromolecule having a polyphosphazene as a backbone, thereby preventing smears.

The composition includes a single component compound which is a reaction product of polydichlorophosphazene, the reactive mesogen element and the vertical alignment element. Thus, an afterimage and a smear may be prevented. Furthermore, the composition for an alignment layer includes a solvent having a low boiling point, so that the solvent dries at a low temperature. As a result, a thermal reaction between the reactive mesogen elements may be prevented, so that the smear may decrease.

BRIEF DESCRIPTION OF THE DRAWINGS

The above and other aspects, advantages and features of this disclosure will become more apparent by describing in detailed exemplary embodiments thereof with reference to the accompanying drawings, in which.

DETAILED DESCRIPTION OF THE INVENTION

Hereinafter, exemplary embodiments of the invention will be explained in detail with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The composition for an alignment layer includes a polyphosphazene-based compound and a solvent.

The polyphosphazene-based compound includes a polyphosphazene as a backbone, a reactive mesogen element, and a vertical alignment element.

The polyphosphazene-based compound may include the backbone, and the backbone may include a polyphosphazene.

The polyphosphazene-based compound may include the reactive mesogen element linked to the polyphosphazene backbone, and the vertical alignment element linked to the polyphosphazene backbone.

A reactive mesogen element and a vertical alignment element may be a nucleophile. Thus, the polyphosphazene-based compound may be formed by a substitution reaction between polydichlorophosphazene, the reactive mesogen element and the vertical alignment element, and thereby the side chains may be formed.

The polydichlorophosphazene may include chlorine (Cl) and phosphorous (P) atoms. The chlorine may be easily substituted by the nucleophile.

In an exemplary embodiment, the polydichlorophosphazene may be a polymer of hexachlorocyclotriphosphazene, and may be formed by ring-opening polymerization of the hexachlorocyclotriphosphazene.

In an exemplary embodiment, the hexachlorocyclotriphosphazene may be heated at a high temperature, which is equal to or more than about 250° C., thereby producing the polydichlorophosphazene.

The polyphosphazene-based compound may be represented by the following Chemical Formula 1. The polyphosphazene-based compound may have a repeated structure of the following Chemical Formula 1.

Chemical Formula 1

In Chemical Formula 1, R1 and R2 are —X—Y-A-Y—Z or —X—Y—B—Y—Z, respectively. The reactive mesogen element may be —X—Y-A-Y—Z, and the vertical alignment element may be —X—Y—B—Y—Z.

In Chemical Formula 1, n represents an integer of 1 to 10,000. The value for n may be appropriately determined based upon a desired molecular weight of the polyphosphazene-based compound.

The polyphosphazene-based compound may include at least one of the reactive mesogen element and at least one of the vertical alignment element.

When the number of side chains is 100, the number of the reactive mesogen element may be 1 to less than 100, and the number of the vertical alignment element may be 1 to less than 100.

The reactive mesogen element and the vertical alignment element may include a nucleophilic portion (X). In an exemplary embodiment, X may represent —NH— or —O—.

The reactive mesogen element and the vertical alignment element may include a connecting portion (Y). The connecting portion may control the length of the side chains.

In an exemplary embodiment, Y may represent a single bond, an alkyl group having 1 to 20 carbons, —CO—, —COO— —(CH$_2$)$_l$O—, —(CH$_2$)$_l$NH—, —(CH$_2$)$_l$—COO— or —CO(CH$_2$)$_l$—COO—, and l may represent an integer of 1 to 10.

The reactive mesogen element and the vertical alignment element may include a reacting portion (Z). The reacting portion may generate a photo reaction or a thermal reaction. For example, Z may represent hydrogen, an alkyl group having 1 to 20 carbons, or an epoxy group.

The reactive mesogen element may include a reactive mesogen portion (A). In an exemplary embodiment, A may represent The vertical alignment element may include a vertical alignment portion (B). In an exemplary embodiment, B may represent In an exemplary embodiment, the polyphosphazene-based compound may have a repeat structure represented by following Chemical Formula 1-1 or the Chemical Formula 1-2.

Chemical Formula 1-1

Chemical Formula 1-2

The polyphosphazene-based compound may further include a capping side chain.

The polyphosphazene-based compound including the capping side chain may have a repeat structure represented by the following Chemical Formula 2.

Chemical Formula 2

In Chemical Formula 2, R1, R2, R3, and R4 independently represent —X—Y-A-Y—Z, —X—Y—B—Y—Z or —X—C.

The reactive mesogen element may be —X—Y-A-Y—Z, the vertical alignment element may be —X—Y—B—Y—Z, and the capping side chain may be —X—C.

In Chemical Formula 2, m represents an integer of 1 to 5,000. The value for m may be appropriately determined by the desired molecular weight of the polyphosphazene-based compound.

The polyphosphazene-based compound may include at least one reactive mesogen element, at least one vertical alignment element and at least one capping side chain.

In an exemplary embodiment, when the number of side chains is 100, the number of the reactive mesogen element may be 1 to less than 100, the number of the vertical alignment element may be 1 to less than 100, and the number of the capping side chain may be 1 to less than 100.

The capping side chain may eliminate any remaining chlorine of the polydichlorophosphazene which does not react with the reactive mesogen element and the vertical alignment element.

The capping side chain may be formed by a capping functional group, and the capping functional group may include a nucleophilic portion (X) to substitute with remaining chlorine of the polydichlorophosphazene. In an exemplary embodiment, X may represent —NH— or —O—.

The capping side chain may include a capping portion (C). For example, C may represent an alkyl group having 1 to 10 carbons or halogen substituted saturated or unsaturated hydrocarbon having 1 to 10 carbons. In an exemplary embodiment, C may be methyl, ethyl, propyl, t-butyl, n-butyl, pentyl, trifluoroethyl, trifluoropropyl, trifluoro-t-butyl, trifluoro-n-butyl or the like.

For example, the polyphosphazene-based compound may have a repeat structure of the following Chemical Formula 2-1 or Chemical Formula 2-2.

Chemical Formula 2-2

Chemical Formula 2-2

The polyphosphazene-based compound is a reaction product of polydichlorophosphazene, the reactive mesogen element and the vertical alignment element. Accordingly, a single component macromolecule is provided which includes the polyphosphazene as a backbone, the reactive mesogen element linked to the polyphosphazene backbone, and the vertical alignment element linked to the polyphosphazene backbone. The composition for the alignment layer may include the single component polyphosphazene-based compound, thereby preventing phase separation and smears.

A weight average molecular weight of the polyphosphazene-based compound may be about 1,000 to about 10,000,000. In an exemplary embodiment, the weight average molecular weight of the polyphosphazene-based compound may be about 1,000,000 to about 10,000,000.

The weight average molecular weight of the polyphosphazene-based compound may be equal to or greater than 1,000,000. Thus, smears on the liquid crystal display panel may be prevented.

The composition for the alignment layer includes the solvent having a low boiling point. A boiling point of the solvent may be equal to or less than 150° C.

In an exemplary embodiment, the solvent may include at least one of tetrahydrofuran, ethyl acetate, toluene, dichloromethane, acetone, methylethylketone, dimethylformamide, cyclohexane and a mixture thereof.

The polyphosphazene-based compound may have a high polarity, so that the polyphosphazene-based compound may have a higher solubility in the solvent than a polyimide-based compound.

The polyimide-based compound may have a low polarity, so that the polyimide-based compound may be dissolved in a solvent having a high boiling point, for example, a boiling point which is more than 150° C. The solvent having the high boiling point may be N-methyl pyrrolidone ("NMP"), butyl carbitol ("BC") or the like. The boiling point of NMP may be about 200° C., and the boiling point of BC may be about 230° C.

The composition for the alignment layer may include the solvent having the low boiling point, so that a processing temperature of the alignment layer may decrease. Thus, the formation of scattered pretilt and smears on the display panel caused by a thermal reaction during a high temperature process, may be prevented.

The composition for the alignment layer may include about 1% by weight to about 30% by weight of the polyphosphazene-based compound and the remainder of the composition for the alignment layer may be solvent.

When the polyphosphazene-based compound is present in the composition for the alignment layer in amounts less than 1% by weight, the alignment layer may not align the liquid crystal molecules. And, when the polyphosphazene-based compound is used in amounts of greater than 30% by weight, the movement of the liquid crystal molecules may not be controlled.

Figure 1:
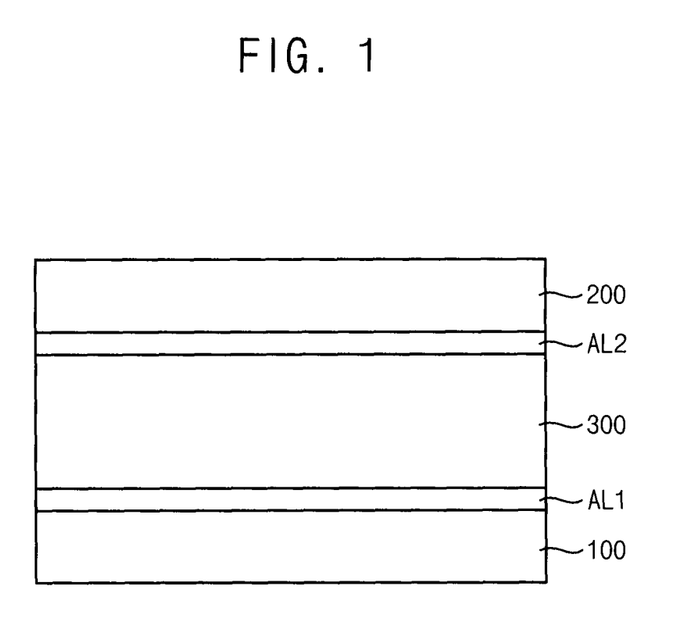
FIG. 1 is an illustration of an exemplary embodiment of a liquid crystal display panel.
Figure 2:
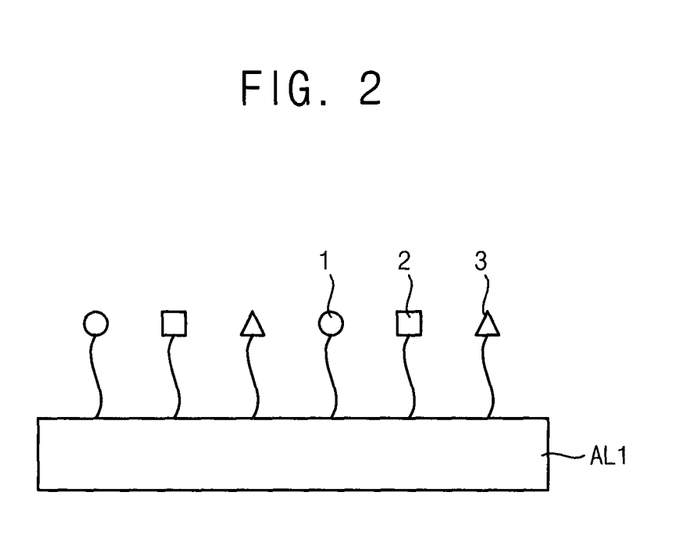
FIG. 2 is an illustration of an exemplary embodiment of an alignment layer.

FIG. 1 is an illustration of an exemplary embodiment of a liquid crystal display panel. FIG. 2 is an illustration of an exemplary embodiment of an alignment layer.

Referring to FIG. 1, in an exemplary embodiment, the liquid crystal display panel includes a first substrate 100, a second substrate 200 and a liquid crystal layer 300.

The first substrate 100 may be a transparent insulation substrate. For example, the transparent insulation substrate may be a glass substrate, a plastic substrate or the like. The first substrate 100 may include a plurality of pixel areas for displaying an image. A plurality of the pixel areas may be disposed in a matrix shape having a plurality of rows and a plurality of columns.

The second substrate 200 may also be a transparent insulation substrate. For example, the transparent insulation substrate may be the glass substrate, the plastic substrate or the like.

The liquid crystal layer 300 may be disposed between the first substrate 100 and the second substrate 200.

The liquid crystal layer 300 may include liquid crystal molecules. When an electric field is not formed in the liquid crystal layer 300, the major axis of the liquid crystal molecules may be vertical to the first substrate 100 and the second substrate 200.

The liquid crystal display panel includes a first alignment layer AL1, and a second alignment layer AL2.

The first alignment layer AL1 may be disposed on a surface of the first substrate 100. In an exemplary embodiment, the first alignment layer AL1 may be disposed between the first substrate 100 and the liquid crystal layer 300. The second alignment layer AL2 may be disposed on a surface of the second substrate 200. In an exemplary embodiment, the second alignment layer AL2 may be disposed between the second substrate 200 and the liquid crystal layer 300.

The alignment layer may pretilt the liquid crystal molecules of the liquid crystal layer 300.

The first alignment layer AL1 and the second alignment layer AL2 may be formed by an alignment liquid. The alignment liquid may be coated on a surface of the first substrate 100 and on a surface of the second substrate 200. The alignment liquid may be coated using a process such as slit coating, spin coating, or the like.

The alignment liquid may be coated on the first substrate 100 and on the second substrate 200 and then the alignment liquid may be partially removed. The alignment liquid may be partially removed by storing for a period of time at a room temperature or by heating.

A thickness of the first alignment layer and the second alignment layer may be about 10 μm to about 100 μm.

The first alignment layer and the second alignment layer may include reactive mesogen elements, and terminal groups of the reactive mesogen elements may be cross-linked with each other.

The cross-linked reactive mesogen groups may be aligned to have a pretilt angle against (e.g., with respect to) the first substrate 100 and the second substrate 200. The pretilt angle may be about 85 degrees (°) to about 89°.

Referring to FIGS. 1 and 2, the first alignment layer AL1 may include a reactive mesogen element 1, a vertical alignment element 2 and a capping side chain 3.

The first alignment layer AL1 may include a polyphosphazene-based compound. The polyphosphazene-based compound may include a polyphosphazene backbone, a reactive mesogen element 1, and a vertical alignment element 2. The polyphosphazene-based compound may be represented by Chemical Formula 1.

The polyphosphazene-based compound may further include the capping side chain 3. The polyphosphazene-based compound including the capping side chain 3 may be represented by Chemical Formula 2.

When the first alignment layer AL1 is formed by the polyphosphazene-based compound, the reactive mesogen element 1, the vertical alignment element 2 and the capping side chain 3 may be disposed on an upper surface of the first alignment layer AL1.

The polyphosphazene backbone of the polyphosphazene-based compound may be parallel to the first substrate 100 and the second substrate 200. Thus, the reactive mesogen element 1, the vertical alignment element 2 and the capping side chain 3 combined with the polyphosphazene backbone may be vertical to the first substrate 100 and to the second substrate 200. Accordingly, liquid crystal molecules of the liquid crystal layer 300 may be vertically aligned.

A first electrode (not shown) may be disposed on the first substrate 100, and a second electrode (not shown) may be disposed on the second substrate 200. A voltage may be applied to the first electrode and the second electrode, so that the liquid crystal molecules may are aligned to have a pretilt angle against the first substrate 100 and the second substrate 200. In an exemplary embodiment, the voltage may be about 10 Volts (V) to about 30V. After that, ultraviolet rays may be irradiated on the first substrate 100 and the second substrate 200 to harden the reactive mesogen element 1. An intensity of the ultraviolet rays may be equal to or greater than 10 Joules per square centimeter (J/cm²).

According to an exemplary embodiment, a composition for an alignment layer and a liquid crystal display panel including the alignment layer, may be used for a liquid crystal display apparatus, an organic light emitting apparatus, or the like.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of various exemplary embodiments disclosed and is not to be construed as limited to the specific exemplary embodiments disclosed, and that modifications to the disclosed exemplary embodiments, as well as other exemplary embodiments, are intended to be included within the scope of the appended claims.

What is claimed is:

1. A liquid crystal display panel comprising:
a first substrate;
a second substrate facing the first substrate; and
an alignment layer disposed on at least one of a surface of the first substrate and a surface of the second substrate,
wherein the alignment layer comprises a polyphosphazene-based compound comprising:
a polyphosphazene backbone,
a reactive mesogen element linked to the polyphosphazene backbone, and
a vertical alignment element linked to the polyphosphazene backbone,
wherein the polyphosphazene-based compound is represented by following Chemical Formula 1,

Chemical Formula 1 wherein,
R1 and R2 are —X—Y-A-Y—Z or —X—Y—B—Y—Z, respectively;
X is —NH— or —O—;
Y is a single bond, an alkyl group having 1 to 20 carbons, —CO—, —COO— —(CH$_2$)$_l$O—, —(CH$_2$)$_l$NH—, —(CH$_2$)$_l$—COO— or —CO(CH$_2$)$_l$—COO—, wherein l is an integer of 1 to 10;
A is B is or -continued

Z is hydrogen, an alkyl group having 1 to 20 carbons, or an epoxy group; and n is an integer of 1 to 10,000.

2. A liquid crystal display panel comprising:
a first substrate;
a second substrate facing the first substrate; and
an alignment layer disposed on at least one of a surface of the first substrate and a surface of the second substrate, wherein the alignment layer comprises a polyphosphazene-based compound comprising:
a polyphosphazene backbone,
a reactive mesogen element linked to the polyphosphazene backbone, and
a vertical alignment element linked to the polyphosphazene backbone,
wherein the polyphosphazene-based compound is represented by following Chemical Formula 2, Chemical Formula 2 wherein,
R1, R2, R3, and R4 independently represent —X—Y-A-Y—Z, —X—Y—B—Y—Z or —X—C,
X is —NH— or —O—, Y represents a single bond, an alkyl group having 1 to 20 carbons, —CO—, —COO— —(CH$_2$)$_l$O—, —(CH$_2$)$_l$NH—, —(CH$_2$)$_l$—COO— or —CO(CH$_2$)$_l$—COO—, wherein l is an integer of 1 to 10;
A is B is C is an alkyl group having 1 to 10 carbons or halogen atom substituted saturated or unsaturated hydrocarbon having 1 to 10 carbons;
Z is hydrogen, an alkyl group having 1 to 20 carbons, or an epoxy group; and
m is an integer of 1 to 5,000.

3. The liquid crystal display panel of claim 1, wherein a weight-average molecular weight of the polyphosphazene-based compound is about 1,000 to about 10,000,000.

4. The liquid crystal display panel of claim 1, wherein an alignment of the polyphosphazene backbone is parallel to the first substrate and the second substrate.

5. The liquid crystal display panel of claim 1, further comprising:
a liquid crystal layer between the first substrate and the second substrate.

6. The liquid crystal display panel of claim 5, wherein the liquid crystal layer comprises liquid crystal molecules, and an alignment of the liquid crystal molecules is vertical to the first substrate and the second substrate.

7. The liquid crystal display panel of claim 5, further comprising a plurality of alignment layers comprising a first alignment layer between the first substrate and the liquid crystal layer, and a second alignment layer between the second substrate and the liquid crystal layer.

8. The liquid crystal display panel of claim 1, wherein a thickness of the alignment layer is about 10 μm to about 100 μm.

9. The liquid crystal display panel of claim 1, wherein terminal groups of the reactive mesogen element are cross-linked with each other.

10. The liquid crystal display panel of claim 9, wherein the cross-linked terminal groups of the reactive mesogen element are aligned to have a pretilt angle against the first substrate and the second substrate.

* * * * *